United States Patent
Lin et al.

(10) Patent No.: US 12,539,776 B1
(45) Date of Patent: Feb. 3, 2026

(54) DEMAND-BASED CONTROL SYSTEM FOR MULTIPLE POWER SUPPLIES

(71) Applicant: The United States of America, as represented by the Secretary of the Navy, Arlington, VA (US)

(72) Inventors: Kevin Jeffrey Lin, Potomac, MD (US); James Robert Mulford, II, Washington, DC (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 14 days.

(21) Appl. No.: 18/785,030

(22) Filed: Jul. 26, 2024

(51) Int. Cl.
*B60L 50/40* (2019.01)
*B60L 50/60* (2019.01)
*H02J 7/34* (2006.01)

(52) U.S. Cl.
CPC ............... *B60L 50/40* (2019.02); *B60L 50/60* (2019.02); *H02J 7/342* (2020.01); *H02J 7/345* (2013.01); *B60L 2200/10* (2013.01); *B60L 2240/547* (2013.01); *B60L 2250/16* (2013.01); *H02J 2207/50* (2020.01)

(58) Field of Classification Search
CPC ...... B60L 50/40; B60L 50/60; B60L 2200/10; B60L 2240/547; B60L 2250/16; H02J 7/342; H02J 7/345; H02J 2207/50
USPC ........................................................ 307/9.1
See application file for complete search history.

(56) References Cited

U.S. PATENT DOCUMENTS

| | | | |
|---|---|---|---|
| 7,002,263 B2 | 2/2006 | Inn | |
| 7,877,622 B2 | 1/2011 | Gruendler | |
| 7,989,977 B2 | 8/2011 | Crane | |
| 8,604,637 B2 * | 12/2013 | Lienkamp | H01M 8/04559 320/140 |
| 9,214,833 B1 | 12/2015 | Kim | |
| 10,381,862 B2 | 8/2019 | Mori | |
| 10,536,004 B2 | 1/2020 | Lewis | |
| 11,784,501 B2 * | 10/2023 | Green | B60R 16/033 318/505 |
| 11,807,127 B2 | 11/2023 | Sullivan | |
| 11,990,791 B2 | 5/2024 | Lee | |
| 2018/0294715 A1 | 10/2018 | Jacobson | |

* cited by examiner

*Primary Examiner* — Rexford N Barnie
*Assistant Examiner* — Swarna N Chowdhuri
(74) *Attorney, Agent, or Firm* — Jesus J. Hernandez; U.S. Department of the Navy, Office of the General Counsel

(57) ABSTRACT

Example embodiments provide a demand-based control system and method comprising a primary power unit, a secondary power unit, a control unit, a processor unit, and a load unit. The primary power unit may be configured to generate a primary power output. The secondary power unit may be configured to generate a secondary power output and to switch between at least two modes of operation. The at least two modes of operation may include a charging mode and an operational mode, wherein the secondary power unit is configured to be recharged by the primary power unit through a connection during the charging mode. The control unit may be connected to the primary power unit and the secondary power unit. The process unit may be configured to cause the control unit to perform the switch between the at least two modes of operation based on the measured electric characteristic.

14 Claims, 9 Drawing Sheets

DEMAND-BASED CONTROL SYSTEM FOR MULTIPLE POWER SUPPLIES

STATEMENT OF GOVERNMENT INTEREST

The following description was made in the performance of official duties by employees of the Department of the Navy. The claimed subject matter, encompassing various example embodiments, may be manufactured, used, licensed by or for the United States Government for governmental purposes without the payment of any royalties thereon. Potential licensees may contact the Technology Transfer Office, NAVSEA Naval Surface Warfare Center, Carderock Division, 9500 MacArthur Ave., West Bethesda, MD 20817, USA.

FIELD

The following description relates generally to power supply control systems.

BACKGROUND

Electrical systems typically use a single power supply, such as a battery. Electrical systems based on a single power supply may handle various power demands—whether high or low. However, these electrical systems afford limited runtime for loads. This issue is particularly acute in unmanned systems.

Conventional approaches to address this issue in electrical systems may include use of more than one power supply. An overlapping control system may be used to switch between power supplies to facilitate power distribution based on load demands. This may include, for example, switching from either a baseline state to a high demand state, or vice versa.

Conventional methods of control systems may use a mechanical or electromechanical switch to transition between power supplies. Conventional approaches may result in an abrupt switch between power supplies. Abrupt switching may cause a drop in power to a load. Drops in power to a load may be particularly pronounced when the switching is intermittent and the load demand goes from high to low in a short time span.

SUMMARY

Example embodiments provide a demand-based control system and method comprising a primary power unit, a secondary power unit, a control unit, a processor unit, and a load unit. The primary power unit may be configured to generate a primary power output. The secondary power unit may be configured to generate a secondary power output and to switch between at least two modes of operation. The at least two modes of operation may include a charging mode and an operational mode, wherein the secondary power unit is configured to be recharged by the primary power unit through a connection during the charging mode. The control unit may be connected to the primary power unit and the secondary power unit. The process unit may be configured to cause the control unit to perform the switch between the at least two modes of operation based on the measured electric characteristic.

Other features and advantages of the invention will become apparent to those skilled in the art upon examination of the following or upon learning by practice of the invention.

BRIEF DESCRIPTION OF DRAWINGS

The accompanying figures are included to provide a further understanding of example embodiments, and are incorporated in and constitute part of this specification. In the figures.

Figure 1:
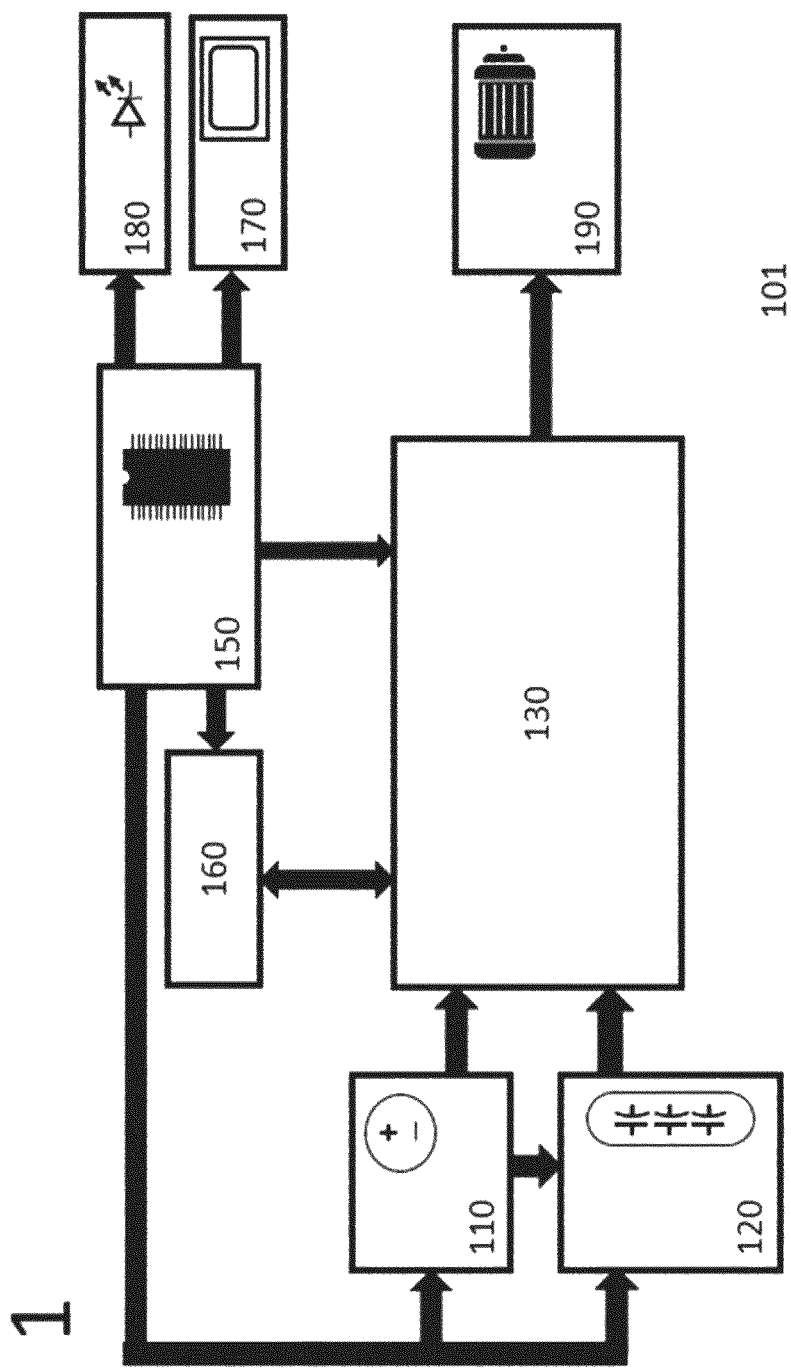
FIG. 1 is an illustration of demand-based control system for multiple power supplies, according to example embodiments.

In the figures, the leading number of each element corresponds to the figure number in order to facilitate better exposition when discussing a feature in a particular example embodiment. Common features across different figures use the same subsequent digits to maintain consistency.

DETAILED DESCRIPTION

In the following description, for purposes of explanation and not limitation, specific details are set forth such as particular structures, designs, techniques, etc., in order to provide a thorough understanding of the example embodiments. However, it will be apparent to those skilled in the art that the disclosed subject matter may be practiced in other illustrative embodiments that depart from these specific details. In some instances, detailed descriptions of well-known elements and/or method are omitted so as not to obscure the description with unnecessary detail. All principles, aspects, and embodiments, as well as specific examples thereof, are intended to encompass both structural and functional equivalents of the disclosed subject matter. Additionally, it is intended that such equivalents include both currently known equivalents as well as equivalents developed in the future.

The following description refers to a demand-based control system and method for multiple power supplies. However, it should be noted that the example embodiments shown and described herein are meant to be illustrative only and not limiting in any way. As such, various modifications will be apparent to those skilled in the art for application to different fields based on technologies other than the above, which may be in various stages of development and intended for future replacement of, or use with, the above described method or apparatus.

Conventional methods of control systems may use a mechanical or electromechanical switch to transition between power supplies. Conventional approaches may result in an abrupt switch between power supplies. A goal of example embodiments is to provide a demand-based control system for multiple power supplies, wherein the demand-based control system is power supply-agnostic and load-agnostic. The demand-based control system may be configured to accommodate both low and high power applications. The configuration of the demand-based control system may be realized through the system's code and/or components.

Example embodiments of a demand-based control system may use a battery and/or supercapacitor to power a load that may operate in different load states. For instance, the load may be a motor of an unmanned vehicle that may operate according to different demand conditions. The unmanned vehicle may be an unmanned aerial vehicle (e.g., a drone). In alternative embodiments, the unmanned vehicle may be an unmanned underwater vehicle, an unmanned surface vehicle, an unmanned ground vehicle, and/or an unmanned space vehicle. Also, the battery may be a non-lithium battery, and the supercapacitor may be a non-lithium supercapacitor.

Using the motor of an unmanned aerial vehicle as an example load for a demand-based control system, such a vehicle may be subject to either low load demand situations (idle, constant velocity), or high load demand situations (takeoff, evasive maneuvers). In low demand situations, a battery may operate the vehicle. However, in sudden, high-demand situations, the demand-based control system may switch from the battery to the supercapacitor in order to supply a short burst of power.

A demand-based control system may have alternative example embodiments when used in an unmanned vehicle. In alternative example embodiments of the demand-based control system, the system may use a high-energy battery and a high-power battery to power a load that may operate in different load states. More specifically, in low-demand situations, the high-energy battery may power the load of a vehicle. In sudden, high-demand situations, the system may switch to the high-power battery to supply a short burst of power to the same load.

FIG. 1 is an illustration 100 of a demand-based control system for multiple power supplies, according to example embodiments. The demand-based control system 101 may comprise a primary power unit 110, a secondary power unit 120, a control unit 130, a processor unit 150, an opto-isolator unit 160, a display unit 170, a processor monitoring unit 180, and a motor unit 190. Various electrical configurations may be used for each respective unit of the demand-based control system 101.

The multiple power supplies in the demand-based control system 101 may be the primary power unit 110 and the secondary power unit 120. The primary power unit 110 and the secondary power unit 120 may provide power to the motor unit 190. In alternative embodiments, the primary power unit 110 and the secondary power unit 120 may provide power to an alternative load, such as a propulsion system, jets, or any other load that requires sudden spurts of increased power consumption. The secondary power unit 120 may comprise a battery, a supercapacitor, or both.

Operational units of the demand-based control system 101 may dictate the toggling between the primary power unit 110 and the secondary power unit 120. The operational units may include the control unit 130, the processor unit 150, the opto-isolator unit 160, and the processor monitoring unit 180. The primary power unit 110 may be connected to the secondary power unit 120 in order to facilitate the switching between the two power units. The switching may be the result of a desired operation. This may include, but is not limited to, the primary power unit 110 charging and/or supplementing the secondary power unit 120.

Power generated by the primary power unit 110 and the secondary power unit 120 may be primarily controlled by the control unit 130 and the processor unit 150. The processor unit 150 may dictate the operation of various electrical switches in the primary power unit 110, the secondary power unit 120, and the control unit 130. The processor unit 150 may operate in conjunction with the control unit 130 to control the amount of power being provided to the motor unit 190. For example, the processor unit 150 and the control unit 13 may dictate the operation of either the primary power unit 110 and the secondary power unit 120 during a startup mode sequence and during a operational mode sequence. The operational mode sequence may include a low-power mode sequence and a high-power mode sequence. In example embodiments where the motor unit 190 corresponds to a propeller in an unmanned aircraft vehicle, the operational mode sequence may correspond to a flight mode sequence and/or a takeoff mode sequence.

To facilitate operation by a user, the demand-based control system 101 may include the display unit 170 and the processor monitoring unit 180. The display unit may depict operational status of the demand-based control system 101. The processor monitoring unit 180 may communicate, in a more simplified fashion, the operational status of the processor unit 150.

During operation, the demand-based control system 101 may monitor the voltages and currents of both the primary power unit 110 and the secondary power unit 120. The processor unit 150 may manage which power supply will power the motor unit 190. The power supply may be a DC supply. During a startup mode sequence and low-power mode sequence, the primary power unit 110 may be operational. In a high-power mode sequence, the secondary power unit 120 may be activated through embedded logic on the processor unit 150. In example embodiments corresponding with an unmanned aerial vehicle, the high-power mode sequence may correspond with a sudden acceleration on an axis of operation (x, y, and/or z), and/or data transmission from a sensor.

Figure 2:
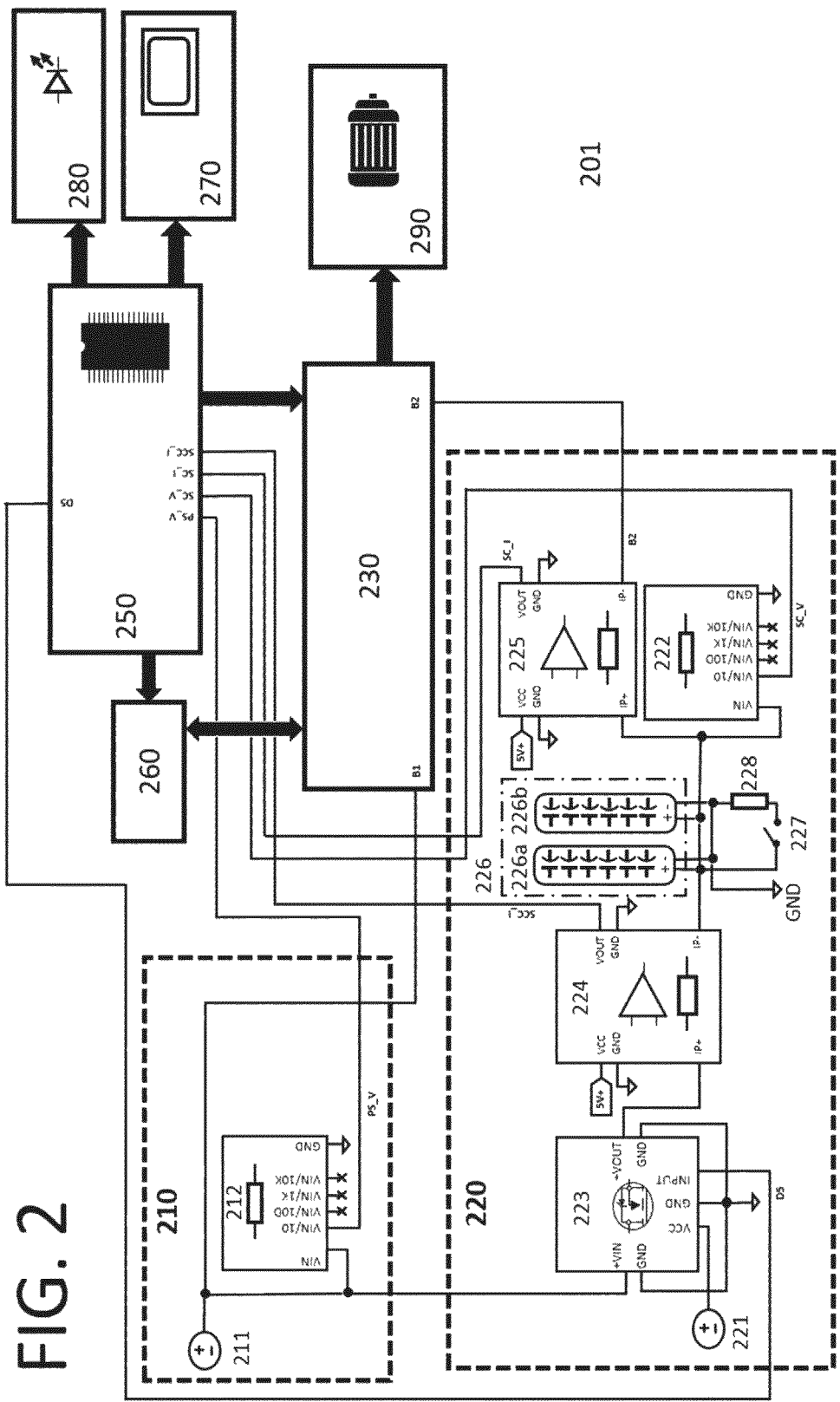
FIG. 2 is a detailed illustration of a primary power unit and secondary power unit in a demand-based control system, according to example embodiments.

FIG. 2 is a detailed illustration 200 of a primary power unit and secondary power unit in a demand-based control system, according to example embodiments. The demand-based control system 201 may comprise a primary power unit 210, a secondary power unit 220, a control unit 230, a processor unit 250, an opto-isolator unit 260, a display unit 270, a processor monitoring unit 280, and a motor unit 290. Illustration 200 provides an in depth view of an example embodiment of the primary power unit 210 and the secondary power unit 220.

The primary power unit 210 may comprise a first power supply 211 and a first power supply voltage divider 212. The first power supply 211 may be a battery. The first power supply 211 may be connected to the first power supply voltage divider 212, the secondary power unit 220, and the control unit 230. The first power supply 211 may be connected to a line B1 of the control unit 230. With respect to the connection of the secondary power unit 220, the first power supply 211 may also be connected to a supercapacitor driver board 223 that is part of the secondary power unit 220. The first power supply 211 may generate a DC voltage. In some example embodiments, the first power supply 211 may generate 12.7 VDC at 5 A.

The first power supply 211 may be connected to a pin VIN of the power supply voltage divider 212. The power supply voltage divider 212 may be a standard model that divides the voltage in the pin VIN according to operational needs of the processor unit 250. In some example embodiments, the power supply voltage divider 212 may be a type 1776 model (e.g., 1776-C6815) that leverages a decade resistor voltage divider configuration with ratios of 10:1 (VIN/10), 100:1 (VIN/100), 1,000:1 (VIN/1,000), and 10,000:1 (VIN/10,000). In illustration 200, a pin corresponding to a ratio of 10:1 (VIN/10) may be used to divide the voltage and feed the divided voltage to a line PS_V of the processor unit 250. The first power supply 211 may also have a pin GND connected to ground.

The secondary power unit 220 may comprise a second power supply 221, the supercapacitor driver board 223, a charger current sense board 224, a supercapacitor array 226, an output current sense board 225, a supercapacitor power resistor 228, a switch 227, and a supercapacitor array voltage divider 222. The configuration of these elements is discussed below.

The second power supply 221 may generate a DC voltage. The second power supply 221 may generate less power than the first power supply 211. In some example embodiments, the second power supply 221 may generate 10 VDC at 1 A. In some example embodiments, the second power supply 221 may be part of a larger system power supply. In alternative example embodiments, the second power supply 221 may be the same as, or part of, the first power supply 211.

The second power supply 221 may be connected to a line VCC of the supercapacitor driver board 223. The supercapacitor driver board 223 may also be connected to the first power supply 211 at line +VIN. The supercapacitor driver board 223 may be a pulse width modulation (PWM) MOSFET driver board. Such a driver board may permit the charging of the supercapacitor array 226. The supercapacitor driver board 223 may be a MOSFET driver board model that allows an indefinite "on" status in order to drive large gate capacitances in short transition times (e.g., DC2708A). The supercapacitor driver board 223 may be a high-voltage, high-side switch with a considerable duty cycle (e.g., 100%). The supercapacitor driver board 223 may have three lines connected to ground (GND). The supercapacitor driver board 223 may have its INPUT line connected to line D5 of the processor unit 250. The processor unit 250 may provide an input signal to the supercapacitor driver board 223 in order to determine an output voltage on line +VOUT. The output voltage may be based on a voltage provided by the first power supply 211 at line +VIN and/or the second power supply 221 at line VCC. The line +VOUT may be connected to the charger current sense board 224.

The charger current sense board 224 may be configured to sense the current provided by the supercapacitor driver board 223 to the supercapacitor array 226. The charger current sense board 224 may comprise current sensors for high-current monitoring and high isolation applications. In particular, the charger current sense board 224 may be a Hall-effect current sensor evaluation board (e.g., EVCS1803-S-50-00A). The charger current sense board 224 may have a DC power supply of 5V+ provided at line VCC, as well as have two ground GND lines. The charger current sense board 224 may measure a passing current through terminals located at a first line IP+ and a second line IP−. A measurement may be provided at line VOUT, which may be provided to a line SCC_I of the processor unit 250. This configuration may permit the processor unit 250 to monitor a charging current being provided to the supercapacitor array 226. The output of the second line IP− may connect directly with the supercapacitor array 226.

The supercapacitor array 226 may comprise two array portions connected in parallel. The two array portions may be a first supercapacitor array portion 226a and a second supercapacitor array portion 226b. Each of the supercapacitor array portions 226a, 226b may be a high power density super-capacitor array. Each of the supercapacitor array portions 226a, 226b may be configured for a quick charge (e.g., 10 seconds to 10 minutes to reach a rated capacity of more than 95%). Each of the supercapacitor array portions 226a, 226b may have a capacitance of 58 Farads. Each of the supercapacitor array portions 226a, 226b may be a 15V module configured to operate at 2.6 Wh at 12.7V (e.g., Maxwell 58F 16V).

The positive line of each of the supercapacitor array portions 226a, 226b may receive a charging current from the charger current sense board 224. The negative line of each of the supercapacitor array portions 226a, 226b may be connected to ground. The negative line and the positive line may be connected by a series connected switch 227 and supercapacitor power resistor 228. The series connected switch 227 and supercapacitor power resistor 228 may function as an e-stop discharge for the supercapacitor array 226.

The supercapacitor array 226 may be configured to store a charge for later use based on a charging current it receives. The charging of the supercapacitor array 226 may be part of a startup mode sequence and/or an operational mode sequence. In some example embodiments, the operational mode sequence may be a flight mode. More specifically, the charging of the supercapacitor array 226 may occur when a measured value of capacitance is below a set point. The supercapacitor array 226 may be discharged if there is a high current demand. Determinations regarding current demands and set points may be undertaken by the processor unit 250.

Output of the supercapacitor array 226 may be received by both a supercapacitor array voltage divider 222 and a output current sense board 225. With respect to the supercapacitor array voltage divider 222, the output of the supercapacitor array 226 may be connected to a line VIN. Like the power supply voltage divider 212, the supercapacitor array voltage divider 222 may be a standard model that divides the voltage provided in line VIN according to operational needs of the processor unit 250. In some example embodiments, the supercapacitor array voltage divider 222 may be a type 1776 model (e.g., 1776-C6815) that leverages a decade resistor voltage divider configuration with ratios of 10:1. In illustration 200, a pin corresponding to a ratio of 10:1 (VIN/10) may be used to divide the voltage and feed the divided voltage to a line SC_V of the processor unit 250. The supercapacitor array voltage divider 222 may also have a pin GND connected to ground.

The output current sense board 225 may be configured to sense the output current from the supercapacitor array 226. Like the charger current sense board 224, the output current sense board 225 may comprise current sensors for high-current monitoring and high isolation applications. The output current sense board 225 may be a Hall-effect current sensor evaluation board (e.g., EVCS1803-S-50-00A). The output current sense board 225 may have a DC power supply of 5V+ provided at line VCC, as well as have two ground GND lines. The output current sense board 225 may measure a passing current through terminals located at a first line IP+ and a second line IP−. A measurement may be provided at line VOUT, which may be provided to a line SC_I of the processor unit 250. This configuration may permit the processor unit 250 to monitor a charging current being provided to the control unit 230. The output of the second line IP− may connect directly with the control unit 230 at a line B2.

The control circuit 230 may be configured to receive the output of either the first power supply 211 or output of the supercapacitor array 226 as facilitated by the supercapacitor driver board 223. The output of the first power supply 211 may be provided via line B1. The output of the supercapacitor array 226 may be provided via line B2, after passing the output current sense board 225 for measurement.

As such, the demand-based control system 201 may allow for the integration of two disparate power supplies delivering DC power to a load in a unmanned system (e.g., motor, a sensor). Conventional systems do not integrate power supplies in such fashion. Instead, conventional systems may use a single battery to handle all power demands—low and high. As a result, such batteries in conventional systems may have limited runtime. The demand-based control system 201 may allow for longer runtime.

Figure 3:
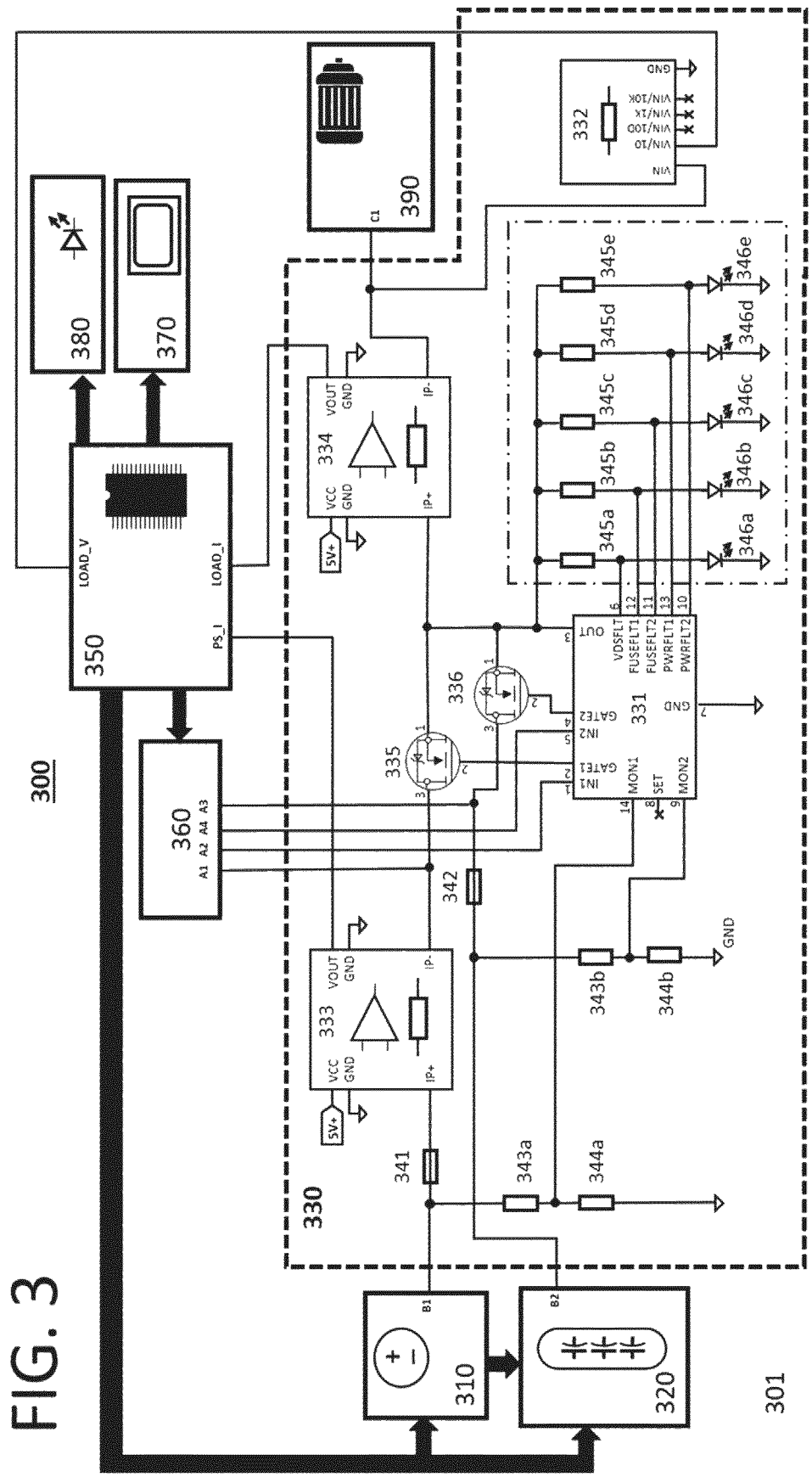
FIG. 3 is a detailed illustration of a control unit in a demand-based control system, according to example embodiments.

FIG. 3 is a detailed illustration 300 of a control unit in a demand-based control system, according to example embodiments. The demand-based control system 301 may comprise a primary power unit 310, a secondary power unit 320, a control unit 330, a processor unit 350, an opto-isolator unit 360, a display unit 370, a processor monitoring unit 380, and a motor unit 390. Illustration 300 provides an in depth view of an example embodiment of the control unit 330. The main components of the control unit 330 may be a controller 331, a primary power supply current sense board 333, a load current sense board 334, a load voltage divider 332, a first transistor switch 335, and a second transistor switch 336. The control unit 330 may include additional electrical components. Operation of the control unit 330 is discussed below.

The control unit 330 may receive power from the primary power unit 310 and/or the secondary power unit 320. With respect to the former, the control unit 330 may receive a primary power output from the primary power unit 310 via line B1. The primary power output may be split into two lines at a node. In one line, there may be a voltage divider circuit comprising a primary power resistor 343a and a primary power resistor 344a connected in series. In some example embodiments, each of the primary power resistors 343a, 344a may have a resistance of 5 k Ohms, 1%. A line may extend from a node between the two resistors 343a, 344a to a pin MON1 of the controller 331.

At a second line, the primary power output may enter a primary power fuse 341. The primary power fuse 341 may have an appropriate rating corresponding with the anticipated primary power output and the tolerance of the primary power supply current sense board 333, the first transistor switch 335, and/or the opto-isolator unit 360. The primary power fuse 341 may break the circuit in control unit 330 if there is an excessive current flow. In some example embodiments, the primary power fuse 341 may have a rating of 75 VDC at 80 amps.

The primary power fuse 341 may be connected to the primary power current sense board 333. The primary power current sense board 333 may be configured to sense the current provided by the primary power unit 310. The primary power current sense board 333 may comprise current sensors for high-current monitoring and high isolation applications. Like other current sense boards described, the primary power current sense board 333 may be a Hall-effect current sensor evaluation board (e.g., EVCS1803-S-50-00A). The primary power current sense board 333 may have a DC power supply of 5V+ provided at line VCC, as well as have two ground GND lines. The primary power current sense board 333 may measure a passing current through terminals located at a first line IP+ and a second line IP−. A measurement may be provided at line VOUT, which may be provided to a line PS_I of the processor unit 350. This configuration may permit the processor unit 350 to monitor a primary power output current being provided to drive a load (e.g., motor unit 390). The output of the second line IP− may connect directly with the opto-isolator unit 360 and the first transistor switch 335.

As previously stated, the control unit 330 may also receive power from the secondary power unit 320. The secondary power unit 320 may comprise a supercapacitor array. The control unit 330 may receive a secondary power output from the secondary power unit 320 via line B2. The secondary power output may be split into two lines at a node. In one line, there may be a voltage divider circuit comprising a secondary power resistor 343b and a secondary power resistor 344b connected in series. In some example embodiments, each of the primary power resistors 343b, 344b may have a resistance of 5 k Ohms, 1%. A line may extend from a node between the two resistors 343b, 344b to a pin MON2 of the controller 331.

At a second line, the secondary power output may enter a secondary power fuse 342. The secondary power fuse 342 may have an appropriate rating corresponding with the anticipated primary power output and the tolerance of the second transistor switch 336, and/or the opto-isolator unit 360. The output of the secondary power fuse 342 may connect directly with the opto-isolator unit 360 and the second transistor switch 336.

The output of the primary power supply current sense board 333 and the secondary power fuse 342 may be provided to the first transistor switch 335 and the second transistor switch 336, respectively. The first transistor switch 335 may control whether the primary power output from the primary power unit 310 will be provided to the motor unit 390. The second transistor switch 336 may control whether the secondary power output from the secondary power unit 320 will be provided to the motor unit 390. The gate of the first transistor switch 335 may be connected to the line GATE1 of the controller 331. The gate of the second transistor switch 336 may be connected to the line GATE2 of the controller 331. The transistors 335, 336 may be n-channel MOSFETs (e.g., FDB3632).

The output of the primary power supply current sense board 333 and the secondary power fuse 342 may be provided to the opto-isolator unit 360 through lines A1 and A3, respectively. The opto-isolator unit 360 may transfer electrical signals from these lines to isolated lines A2 and A4, respectively. The opto-isolator unit 360 may remove electrical noise from the supplied power. Since the controller 331 may operate at low voltages, the opto-isolator unit 360 is intended to isolate controller 331 from high-voltages that may be provided from the primary power unit 310 and the secondary power unit 320, but still within the parameters of the power fuses 341, 342. The output of the opto-isolator unit 360 may be provided the pins IN1 and IN2 of the controller 331.

The controller 331 may use as input the primary power output provided at pin MON1, the secondary power output provided a pin MON2, the opto-isolator unit 360 output from line A2 provided to pin IN1, and/or the opto-isolator unit 360 output from line A4 provided to pin IN2. The controller 331 may use some and/or all of these inputs to assess an activation of the gate of the first transistor switch 335 and/or the gate of the second transistor switch 336. More generally, the controller 331 may determine if the motor unit 390 will be powered by the primary power output and/or the secondary power output.

The controller 331 may have a close relationship with the processor unit 350. The controller 331 may be a positive voltage ideal diode-OR controller (e.g., LTC4355). DC power may flow through the first transistor switch 335 and the second transistor switch 336 attached to the controller 331. The processor 350 may read voltages and currents from both the primary power unit 310 and the secondary power unit 320. In some example embodiments, the processor unit 350 may also read the system's overall power source (e.g., an unmanned system's battery). The processor 350 may send a digital signal to activate the opto-isolator unit 360. The opto-isolator unit 360 may provide the read voltages to pins IN1 and IN2 of the controller 331. When controller 331 reads the provided signals to pins IN1 and IN2, it may send a voltage to a selected one of the first transistor switch 335 and the second transistor switch 336. This functionality may permit DC power to flow from a selected one of the primary power unit 310 and the secondary power unit 320. The opto-isolator unit 360 may comprise one opto-isolator transistor per power supply, which corresponds to a transistor switch per power unit. Accordingly, when one power unit is operational, the other is disabled through the aforementioned architecture.

Various additional components may measure and/or track the selected output power from either the first transistor switch 335 and the second transistor switch 336. The controller 331 may have a pin OUT connected to the output. The controller 331 may also have a set of status monitoring components connected to the output. The status monitoring components may be optional. Each status monitoring component may be a resistor and light emitting diode (LED) pair connected to a monitoring pin of the controller 331. For example, a first status monitoring resistor 345a and a first monitoring LED 346a may be connected to a pin VDSFLT of the controller 331. This pair may indicate if there is a fault in the output from either the first transistor switch 335 and the second transistor switch 336. A second status monitoring resistor 345b and a second monitoring LED 346b may be connected to a pin FUSEFLT1 of the controller 331. This pair may indicate if there is a fuse fault corresponding to the primary power output. A third status monitoring resistor 345c and a third monitoring LED 346c may be connected to a pin FUSEFLT2 of the controller 331, and may indicate if there is a fuse fault corresponding to the secondary power output. A fourth status monitoring resistor 345d and a fourth monitoring LED 346d may be connected to a pin PWRFLT1 of the controller 331, and may indicate if there is power fault corresponding to the primary power output. A fifth status monitoring resistor 345e and a fifth monitoring LED 346e may be connected to a pin PWRFLT2 of the controller 331, and may indicate if there is power fault corresponding to the secondary power output. Each of the status monitoring resistors 345a, 345b, 345c, 345d, 345e may have a resistance of 511 Ohms, 1%.

The selected output power from either the first transistor switch 335 and the second transistor switch 336 may also be connected to a load current sense board 334. The load current sense board 334 may be configured to sense the output power. The load current sense board 334 may comprise current sensors for high-current monitoring and high isolation applications. Like other current sense boards described, the load current sense board 334 may be a Hall-effect current sensor evaluation board (e.g., EVCS1803-S-50-00A). The load current sense board 334 may have a DC power supply of 5V+ provided at line VCC, as well as have two ground GND lines. The load current sense board 334 may measure a passing current through terminals located at a first line IP+ and a second line IP−. A measurement may be provided at line VOUT, which may be provided to a line LOAD_I of the processor unit 350. This configuration may permit the processor unit 350 to monitor an output being provided to a load (e.g., motor unit 390). The output of the second line IP− may connect directly with the motor unit 390.

The load current sense board 334 may also be connected to a load voltage divider 332. More specifically, the output of the load current sense board 334 may be connected to a line VIN. Like previously discussed voltage divider elements, the load voltage divider 332 may be a standard model that divides the voltage provided in line VIN according to operational needs of the processor unit 350. In some example embodiments, the load voltage divider 332 may be a type 1776 model (e.g., 1776-C6815) that leverages a decade resistor voltage divider configuration with ratios of 10:1, as previously discussed. In illustration 300, a pin corresponding to a ratio of 10:1 (VIN/10) may be used to divide the voltage and feed the divided voltage to a line LOAD_V of the processor unit 250. The load voltage divider 332 may also have a pin GND connected to ground.

Figure 4:
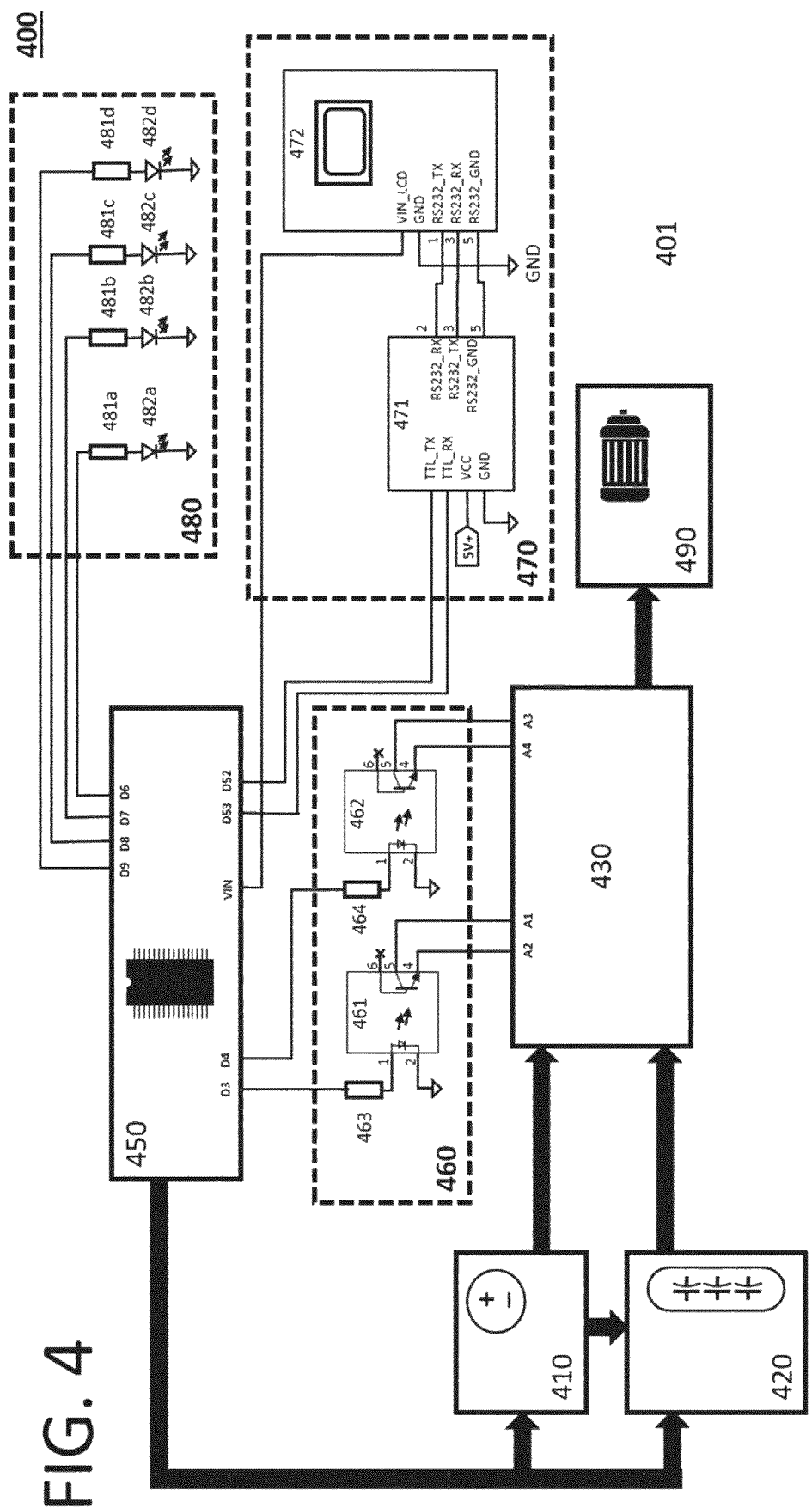
FIG. 4 is a detailed illustration of an opto-isolator unit, a display unit, and a processor monitoring unit in a demand-based control system, according to example embodiments.

FIG. 4 is a detailed illustration 400 of an opto-isolator unit, a display unit, and a processor monitoring unit in a demand-based control system, according to example embodiments. The demand-based control system 401 may comprise a primary power unit 410, a secondary power unit 420, a control unit 430, a processor unit 450, an opto-isolator unit 460, a display unit 470, a processor monitoring unit 480, and a motor unit 490. Illustration 400 provides an in depth view of example embodiments of the opto-isolator unit 460, the display unit 470, and the processor monitoring unit 480.

The opto-isolator unit 460 may comprise a first opto-isolator transistor 461 and a second opto-isolator transistor 462. The opto-isolator transistors 461, 462 may be an optically coupled infrared emitting diode coupled with a phototransistor (e.g., CNY17). Signal information provided to each of the opto-isolator transistors 461, 462 may be transmitted to the control unit 430 while maintaining a high degree of electrical isolation between input and output. Other comparable components may be used in lieu of opto-isolator transistors 461, 462, while mindful of use parameters (e.g., analog devices, relays).

The first opto-isolator transistor 461 may be associated with an output from the primary power unit 410. More specifically, the first opto-isolator transistor 461 may receive a primary power output via line A1 of the control unit 430. The first opto-isolator transistor 461 also may receive a controlling voltage from line D3 of the processor unit 450, which also may include a connected first opto-isolator resistance 463. The controlling voltage may activate the infrared emitting diode in the first opto-isolator transistor 461, thereby controlling the gate function of the phototransistor therein. The output may be provided to the line A2 of the control unit 430. The first opto-isolator resistance 463 may have a resistance of 60 Ohms, 1%.

Similarly, the second opto-isolator transistor 462 may receive a secondary power output via line A3 of the control unit 430. The second opto-isolator transistor 462 may receive a controlling voltage from line D4 of the processor unit 450, which also includes a connected second opto-isolator resistance 464. The controlling voltage may activate the infrared emitting diode in the second opto-isolator transistor 462, thereby controlling the gate function of the phototransistor therein. The output may be provided to the line A4 of the control unit 430. The second opto-isolator resistance 464 may have a resistance of 60 Ohms, 1%.

The display unit 470 may comprise a converter 471 and an LCD display 472. The converter 471 may be any type of converter that allows conversion from a communication format of the processor unit 450 to that of a desired display. In some example embodiments, the conversion may be from Transistor-Transistor Logic (TTL) to RS232 standard format. As such, the converter 471 may be a TTL to RS232 converter (e.g., Grove-RS232). In this configuration, the converter 471 may have the lines D53 and D54 from the processor unit 450 connected to input pins TTL_TX and TTL_RX. Output pins RS232_RX and RS232_RX may be connected to the LCD display 472. The converter 471 may have a voltage 5 V+ connected to pin VCC and ground connected to pin GND.

The LCD display 472 may depict information about the entire demand-based control system 401. In some example embodiments, the LCD display 472 may facilitate interaction with a user in addition to displaying information. More particularly, the LCD display 472 may be a capacitive touch display (e.g., SGD 43-A). The LCD display 472 may receive an operating voltage from line VIN of the processor unit 450 to pin VIN_LCD. The LCD. Display 472 may also be connect to ground at pin GND. The LCD display 472 may receive RS232 converted communication from the converter 471 in corresponding pins—RS232_RX and RS232_RX.

The processor monitoring unit 480 may comprise a pair of serially connected monitoring LEDs and monitoring resistances, respectively. The processor monitoring unit 480 may provide status information in a binary fashion by lighting individual LEDs. For example, a first monitoring resistance 481*a* may be paired with a first monitoring LED 482*a*. This pair may indicate that the demand-based control system 401 is operating under a primary power unit mode (i.e., based on the primary power unit 410). A second monitoring resistance 481*b* may be paired with a second monitoring LED 482*b*. This pair may indicate that the demand-based control system 401 is operating under a supercapacitor mode (i.e., based on the secondary power unit 420). A third monitoring resistance 481*c* may be paired with a third monitoring LED 482*c*. This pair may indicate that the demand-based control system 401 is operating under a supercapacitor charging mode. This mode may be depicted in a different color LED to distinguish from the operational status of the first two modes. A fourth monitoring resistance 481*d* may be paired with a fourth monitoring LED 482*d*. This pair may indicate that the primary power unit is operating below a setpoint value (i.e., running low). The entire processor monitoring unit 480 may be optional.

Figure 5:
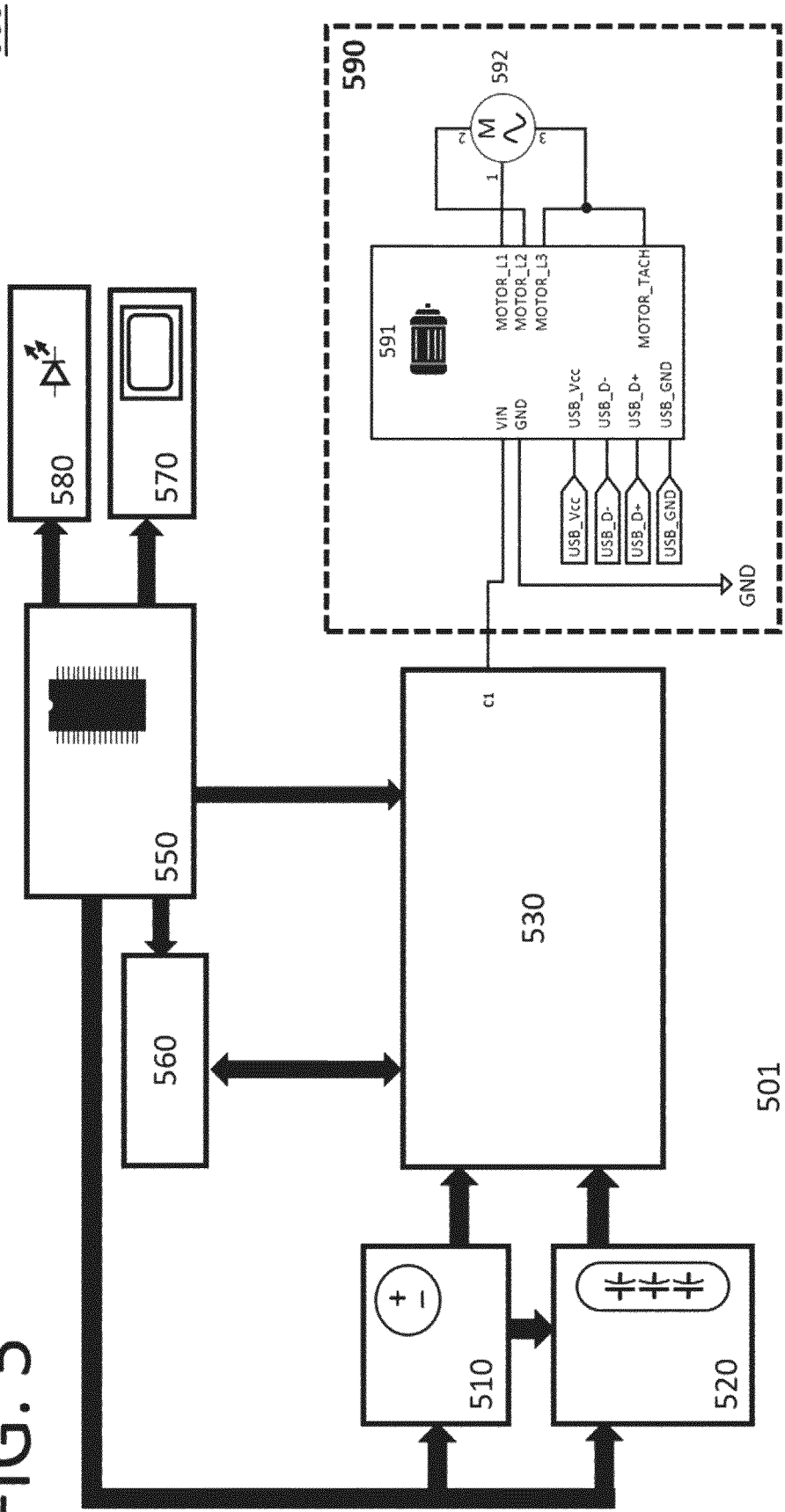
FIG. 5 is a detailed illustration of a motor unit in a demand-based control system, according to example embodiments.

FIG. 5 is a detailed illustration 500 of a motor unit in a demand-based control system, according to example embodiments. The demand-based control system 501 may comprise a primary power unit 510, a secondary power unit 520, a control unit 530, a processor unit 550, an opto-isolator unit 560, a display unit 570, a processor monitoring unit 580, and a motor unit 590. Illustration 500 provides an in depth view of example embodiments of the motor unit 590. In alternative example embodiments, the motor unit 590 may be replaced with any high transient electrical load appropriate for the apparatus in which the demand-based control system 501 is housed.

The motor unit 590 may comprise a motor controller 591 and a motor 592. The motor controller 591 may be a PWM brushless motor controller. The motor controller 591 may be a USB motor controller, such that it may receive operational signals via a USB connection, as represented by pins USB_Vcc, USB_D−, USB_D+, and USB_GND. The motor controller 591 may be connected to a driving power at pin VIN, and to ground at pin GND. The driving power may be provided from line C1 connecting to the control circuit 530. The driving power may be selected by the control circuit 530 between a primary power output and a secondary power output, based on measurements undertaken by the control circuit 530 and/or the processing unit 550.

The motor controller 591 may directly connect to a motor 592. The motor 592 may be a 3-phase brushless motor. As such, the connection may be made by 3 lines: MOTOR_L1; MOTOR_L2; and MOTOR_L3. The line MOTOR_L3 may also be connected to a pin MOTOR_TACH.

Figure 6:
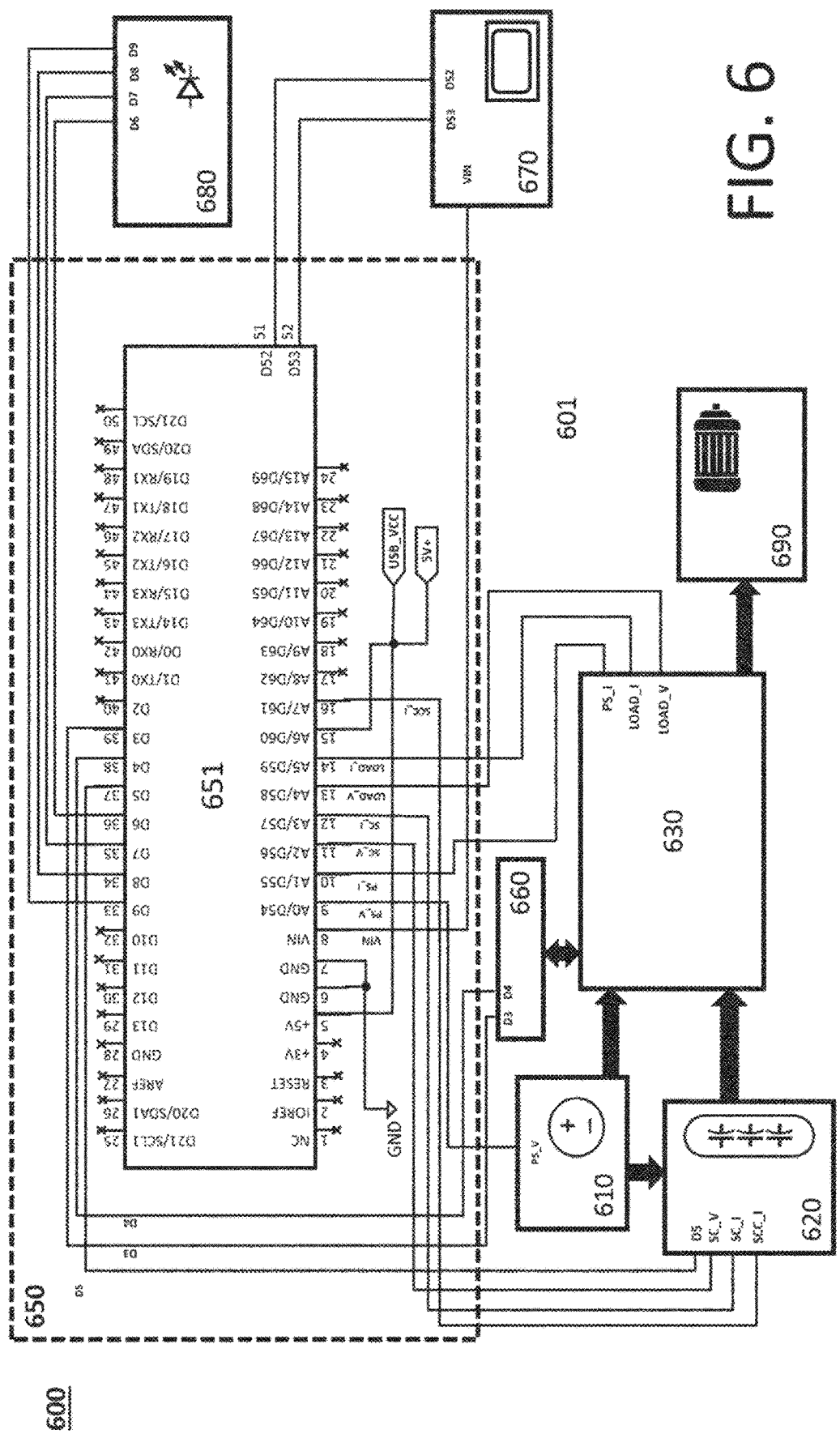
FIG. 6 is a detailed illustration of a processor unit in a demand-based control system, according to example embodiments.

FIG. 6 is a detailed illustration 600 of a processor unit in a demand-based control system, according to example embodiments. The demand-based control system 601 may comprise a primary power unit 610, a secondary power unit 620, a control unit 630, a processor unit 650, an opto-isolator unit 660, a display unit 670, a processor monitoring unit 680, and a motor unit 690. Illustration 600 provides an in depth view of example embodiments of the processor unit 650.

The processor unit 650 may comprise a processor 651. In some example embodiments, the processor 651 may be an Arduino controller (e.g., Arduino Mega 2560 Host Controller). In this example embodiment, the processor may have 52 pins. The pins may be configured to receive and/or send signals that are analog (A0-A15) or digital (D0-D53). In some example embodiments, the pins may be general-purpose input/output (GPIO). The processor 651 may be connected to the primary power unit 610, the secondary power unit 620, the control unit 630, the opto-isolator unit 660, the display unit 670, and the processor monitoring unit 680. The processor may also be connected to a USB voltage supply line USB_VCC, a 5V+ supply line, and ground. Each of these connections is discussed further below. In alternative example embodiments, the processor 651 may be connected to the motor unit 690 as a feedback loop and/or a controlling arrangement.

With respect to the primary power unit 610, processor 651 may receive an input over line PS_V. The input over line PS_V may correspond to a voltage that has been subject to a first power supply voltage divider to facilitate input from the circuitry of the primary power unit 610.

With respect to the secondary power unit 620, the processor 651 may receive inputs over lines SC_V, SC_I, and SCC_I. The input over line SC_V may correspond to a voltage that has been subject to a supercapacitor array voltage divider. The input over line SC_I may correspond to a signal from an output current sense board connected to the output of a supercapacitor array. The signal over the line SC_I may be a measured current. The input over line SCC_I may correspond to a signal from a charger current sense board connected to an input of the supercapacitor array. The signal over the line SCC_I may be a measured current. The processor 651 may also have a line D5 that is connected to an input pin of a supercapacitor driver board. This configuration permits the processor 651 to control charging of the supercapacitor array.

With respect to the control unit 630, the processor 651 may receive inputs over lines PS_I, LOAD_I, and LOAD_V. The input over line PS_I may correspond to a signal from a primary power supply current sense board. The signal over line PS_I may be a measured current. The input over line LOAD_I may correspond to a signal from a load current sense board. The signal over line PS_I may be a measured current. The input over line LOAD_V may correspond to a voltage that has been subject to a load voltage divider.

With respect to the opto-isolator unit 660, the processor 651 may provide signals over lines D3 and D4. The signal over line D3 may correspond to a signal to a first opto-isolator transistor. The signal over line D4 may correspond to a signal to a second opto-isolator transistor. The signals over D3 and D4 may dictate selection between a primary power output and a secondary power output.

With respect to the display unit 670, the processor 651 may provide signals over lines D52 and D53. The signals over lines D52 and D53 may correspond to TTL signals being provided to a converter for eventual input into an LCD display. The processor 651 may also provide and/or receive a voltage over line VIN.

With respect to the processor monitoring unit 680, the processor 651 may provide signals over lines D6, D7, D8, and D9. The signals over lines D6, D7, D8, and D9 may correspond to status signals of the demand-based control system 601. The status signals may correspond to a primary power unit mode, a supercapacitor mode, a supercapacitor charging mode, and/or a primary power unit mode.

The processor 651 may process the various inputs of the components in the demand-based control system 601 to facilitate a supercapacitor charging mode. The secondary power unit 620 may comprise the supercapacitor subject to this mode of operation. More specifically, when the processor 651 measures that a voltage of the primary power unit 610 is at or below a predetermined setpoint value, the secondary power unit 620 may be charged (and/or recharged). The secondary power unit 620 may be charged by the primary power unit 610. Through its various output lines to the secondary power unit 620, the control unit 630, and the opto-isolator unit 660, the processor 651 may disable the secondary power unit 620, enable the primary power unit 610, and enable a switch (supercapacitor driver board) that links the secondary power unit 620 and the primary power unit 610. It should be noted that the supercapacitor driver board switch is usually in an open state. Once the secondary power unit 620 reaches a full voltage setpoint value, the supercapacitor driver board switch may be opened by the processor 651 and the primary power unit 610 may power the overall system. In alternative example embodiments, the secondary power unit 620 may be charged by a separate power source other than the primary power source 610.

In alternative example embodiments, the processor 651 may instead be a diode microcontroller with custom programming configured to (i) detect when a load demand increases suddenly and (ii) determine when to charge the secondary. Such a component may use a diode OR-ing chip to transition between the primary power unit 610 and the secondary power unit 620. When the secondary power unit 620 accomplishes powering the system after it has entered a sudden high load demand, the diode microcontroller may command the diode OR'ing chip to switch back to the secondary power unit 620.

Figure 7:
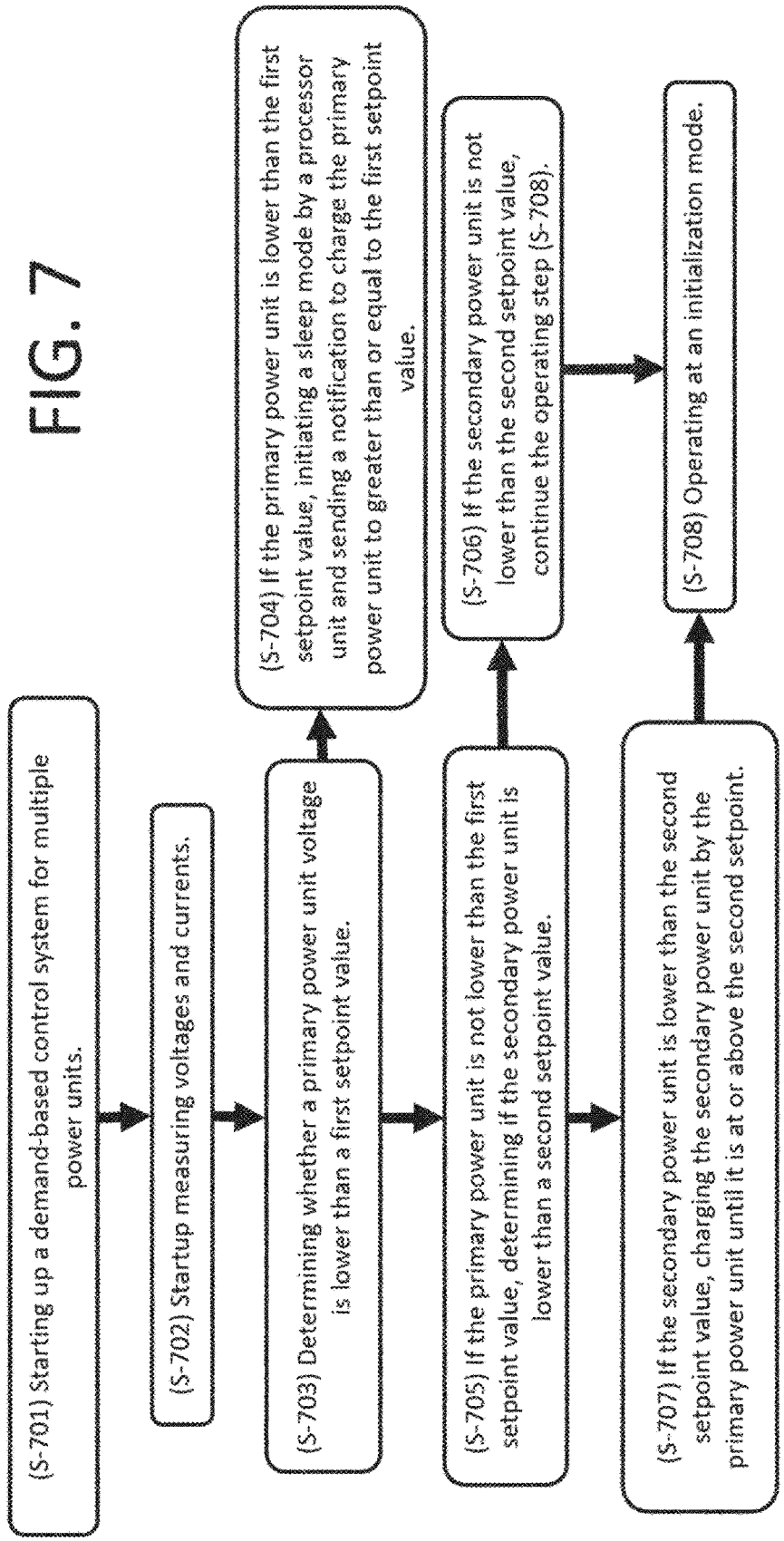
FIG. 7 is an illustration of a startup sequence method of a demand-based control system, according to example embodiments.

FIG. 7 is an illustration 700 of a startup sequence method for a demand-based control system, according to example embodiments. The startup sequence method may commence with (S-701) starting up the demand-based control system for multiple power units. This may be followed by (S-702) measuring all voltages and currents. The voltages and currents may be measured by a processor unit based on input from a primary power unit, a secondary power unit, and/or a control unit. The next step may be (S-703) determining whether a primary power unit voltage is lower than a first setpoint value. If the primary power unit is lower than the first setpoint value, the next step is (S-704) initiating a sleep mode by a processor unit and sending a notification to charge the primary power unit to greater than or equal to the first setpoint value. Alternatively, if the primary power unit is not lower than the first setpoint value, the next step is (S-705) determining if the secondary power unit is lower than a second setpoint value. The first setpoint value and the second setpoint value may be the same value or different values.

With respect to the secondary power unit, (S-706) the initialization mode may continue if the secondary power unit is not lower than the second setpoint value. Alternatively, if the secondary power unit is lower than the second setpoint value, then the next step is (S-707) charging the secondary power unit by the primary power unit until it is at or above the second setpoint. The demand-based control system may (S-708) operate at an initialization mode after either step (S-707) or (S-706), whichever is the case.

Figure 8:
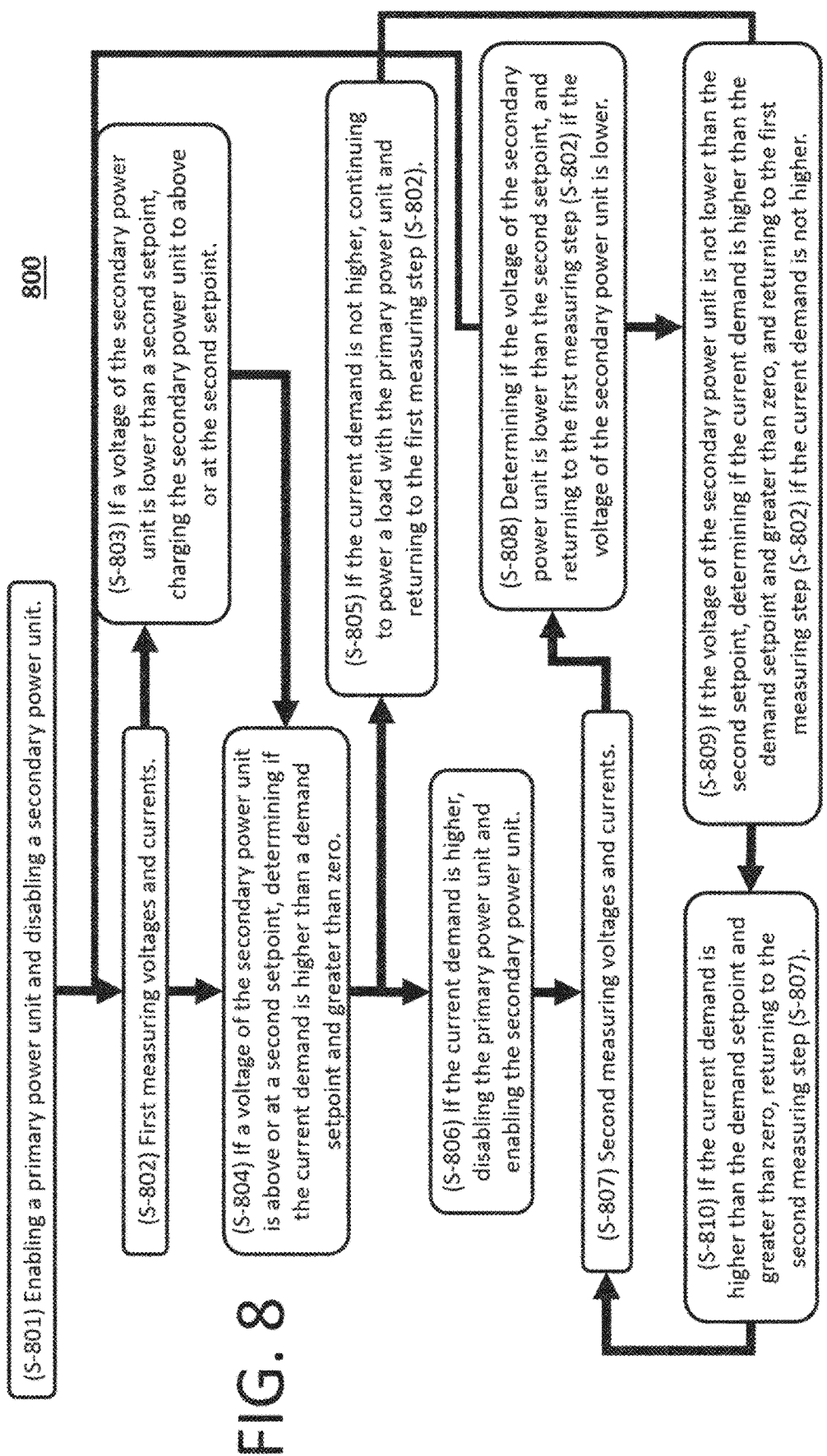
FIG. 8 is an illustration of an operational mode method for a demand-based control system, according to example embodiments.

FIG. 8 is an illustration 800 of an operational mode method for a demand-based control system, according to example embodiments. The operational mode may apply when the demand-based control system is incorporated into an unmanned vehicle, particularly an unmanned aircraft vehicle. In such an example embodiment, the operational mode may be a flight mode.

The method may begin with (S-801) enabling a primary power unit and disabling a secondary power unit. Next is a (S-802) first measuring all voltages and currents. The voltages and currents may be measured by a processor unit based on input from a primary power unit, a secondary power unit, and/or a control unit. If a voltage of the secondary power unit is lower than a second setpoint, the next step is (S-803) charging the secondary power unit to above or at the second setpoint. Alternatively, if a voltage of the secondary power unit is above or at a second setpoint, then the following step is (S-804) determining if the current demand is higher than a demand setpoint and greater than zero.

During the current demand determination, if the current demand is not higher than the demand setpoint, (S-805) continue powering a load with the primary power unit and then returning to the first measuring step (S-802). Alternatively, if the current demand is higher than the demand setpoint, the next step may be (S-806) disabling the primary power unit and enabling the secondary power unit. Thereafter, the method may undertake a (S-807) second measuring all voltages and currents.

The focus may then turn to the secondary power unit that is driving the load. More specifically, the next step may be (S-808) determining if the voltage of the secondary power unit is lower than the second setpoint, and returning to the first measuring step (S-802) if the voltage of the secondary power unit is lower. If the voltage of the secondary power unit is not lower than the second setpoint, the next step may be (S-809) determining if the current demand is higher than the demand setpoint and greater than zero and returning to the first measuring step (S-802) if the current demand is not higher. At this point, if the current demand is higher than the demand setpoint and greater than zero, the next step may be (S-810) returning to the second measuring step (S-807). When the process returns to the second measuring step (S-807), it may continue as previously described.

Figure 9:
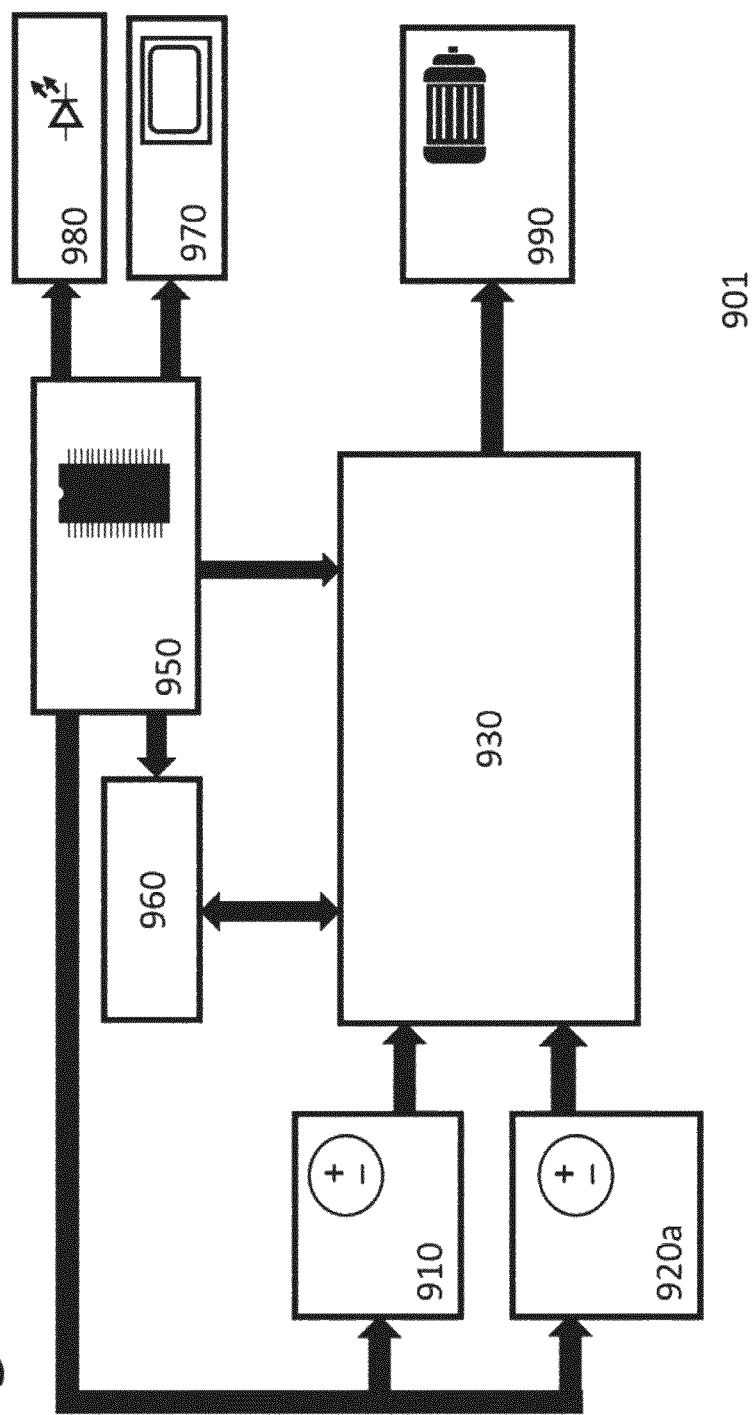
FIG. 9 is an alternative illustration of demand-based control system for multiple power supplies, according to example embodiments.

FIG. 9 is an alternative illustration 900 of demand-based control system for multiple power supplies, according to example embodiments. The demand-based control system 901 may comprise a primary power unit 910, a secondary power unit 920a, a control unit 930, a processor unit 950, an opto-isolator unit 960, a display unit 970, a processor monitoring unit 980, and a motor unit 990. Notably, in this example embodiment, the primary power unit 910 and the secondary power unit 920*a* are not connected. In this example embodiment, the secondary power unit 920*a* may comprise a power supply in lieu of a supercapacitor. The secondary power unit 920*a* may be rechargeable, but need not be charged by the primary power unit 910.

The example embodiments being thus described, it will be obvious that the same may be varied in many ways. Such variations are not to be regarded as a departure from the disclosed subject matter, and all such modifications are intended to be included within the scope of the disclosed subject matter.

What is claimed is:

1. A demand-based control system comprising: a primary power unit configured to generate a primary power output, a secondary power unit configured to generate a secondary power output, the secondary power unit configured to switch between at least two modes of operation, wherein the at least two modes of operation include a charging mode and an operational mode, wherein the secondary power unit is configured to be recharged by the primary power unit through a connection during the charging mode; a control unit connected to the primary power unit and the secondary power unit such that it is configured to receive the primary power output and the secondary power output and select a load power out; a processor unit connected to the primary power unit, the secondary power unit, and the control unit, the processor unit configured to monitor the primary power output and the secondary power output by measuring electric characteristics, wherein the process unit is configured to cause the control unit to perform the switch between the at least two modes of operation based on the measured electric characteristics; and a load connected to the control unit and configured to receive the load power output, wherein the measured characteristics are compared to at least one setpoint value when selecting one of the at least two modes; wherein the control unit comprises, a first current sense board configured to measure the primary power output and provide a first measurement to the processor unit; a load current sense board configured to measure a load power output and provide a load power measurement to the processor unit; wherein the secondary power unit comprises, a second current sense board configured to measure the secondary power output and provide a second measurement to the processor unit; a charge current sense board configured to measure a charging power input and provide a charge power measurement to the processor unit; wherein the processor unit is configured to process the first measurement, the load power measurement, the second measurement, and the charge power measurement to monitor the demand-based control system based on at least one setpoint value.

2. The demand-based control system of claim 1, further comprising: an opto-isolator unit connected to the control unit and the processor unit, the opto-isolator configured to receive the primary power input and the secondary power output from the control unit, the opto-isolator further configured to provide a responsive output based on at least one controlling voltage from the processor unit.

3. The demand-based control system of claim 2, wherein the control unit comprises, a controller configured to receive the primary power output and the secondary power output, the controller configured to be connected to the opto-isolator unit; a first transistor switch connected to the controller and the opto-isolator unit, the first transistor configured to receive the primary power output; a second transistor switch connected to the controller and the opto-isolator unit, the second transistor configured to receive the secondary power output; wherein the controller is configured to provide a controlling signal to at least one of the first transistor switch and the second transistor switch based on the responsive output from the opto-isolator unit.

4. The demand-based control system of claim 1, wherein the first measurement, the load power measurement, the second measurement, and the charge power measurement correspond to a measured current.

5. The demand-based control system of claim 1, wherein the charge power measurement corresponds to an input to a supercapacitor array, and the second measurement corresponds to an output from the supercapacitor array.

6. The demand-based control system of claim 1, wherein the primary power unit comprises a first power supply divider configured to provide a first divided voltage to the processor unit; wherein the secondary power unit comprises a second power supply divider configured to provide a second divided voltage to the processor unit; wherein the control unit comprises a load power divider configured to provide a third divided voltage to the processor unit; wherein the processor unit is configured to process the first divided voltage, the second divided voltage, and the third divided voltage to monitor the demand-based control system based on at least one setpoint value.

7. The demand-based control system of claim 6, wherein the second divided voltage is based on an output from a supercapacitor array.

8. The demand-based control system of claim 1, wherein the secondary power unit comprises: a supercapacitor array configured to be charged by the primary power unit, the supercapacitor array being connected to a supercapacitor switch that allows the supercapacitor array to receive the charge from the primary power unit, wherein the supercapacitor switch may be activated or inactivated by the processor unit.

9. The demand-based control system of claim 8, wherein the supercapacitor array comprises: a first supercapacitor array portion and a second supercapacitor array portion connected in parallel, a discharge component connected between the first supercapacitor array portion and the second supercapacitor array portion, the discharge component comprising a power resistor and a series connected switch.

10. The demand-based control system of claim 1, further comprising: a display unit configured to display detailed status information to a user, the display unit connected to the processor unit and configured to receive information from the processor unit; and a processor monitoring unit configured to display binary status information by lighting individual LEDs.

11. The demand-based control system of claim 1, wherein the load comprises a motor.

12. The demand-based control system of claim 11, wherein the demand-based control system is part of an unmanned aerial vehicle, and the motor facilitates flight of the unmanned aerial vehicle.

13. A demand-based control method comprising:
a startup mode comprising,
starting up a demand-based control system for multiple power units;
startup measuring voltages and currents;
determining whether a primary power unit voltage is lower than a first setpoint value;
if the primary power unit is lower than the first setpoint value, initiating a sleep mode by a processor unit and sending a notification to charge the primary power unit to greater than or equal to the first setpoint value;

if the primary power unit is not lower than the first setpoint value;

determining if the secondary power unit is lower than a second setpoint value;

if the secondary power unit is not lower than the second setpoint value, operating at an initialization mode;

if the secondary power unit is lower than the second setpoint value, charging the secondary power unit by the primary power unit until it is at or above the second setpoint; and operating at the initialization mode.

14. The demand-based control method of claim 13, further comprising:

an operational mode comprising, enabling the primary power unit and disabling the secondary power unit first measuring voltages and currents;

if a voltage of the secondary power unit is lower than a second setpoint, charging the secondary power unit to above or at the second setpoint;

if a voltage of the secondary power unit is above or at a second setpoint, determining if the current demand is higher than a demand setpoint and greater than zero;

if the current demand is not higher, continuing to power a load with the primary power unit and returning to the first measuring step;

if the current demand is higher, disabling the primary power unit and enabling the secondary power unit;

second measuring all voltages and currents;

determining if the voltage of the secondary power unit is lower than the second setpoint, and returning to the first measuring step if the voltage of the secondary power unit is lower;

if the voltage of the secondary power unit is not lower than the second setpoint, determining if the current demand is higher than the demand setpoint and greater than zero, and returning to the first measuring step if the current demand is not higher; and if the current demand is higher than the demand setpoint and greater than zero, returning to the second measuring step.

\* \* \* \* \*